US012752772B2

(12) United States Patent
Higuma

(10) Patent No.: US 12,752,772 B2
(45) Date of Patent: Oct. 6, 2026

(54) PARK ASSIST SYSTEM

(71) Applicant: TOYOTA JIDOSHA KABUSHIKI KAISHA, Toyota (JP)

(72) Inventor: Tomohito Higuma, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 8 days.

(21) Appl. No.: 18/966,949

(22) Filed: Dec. 3, 2024

(65) Prior Publication Data

US 2025/0269843 A1 Aug. 28, 2025

(30) Foreign Application Priority Data

Feb. 26, 2024 (JP) ................................. 2024-026695

(51) Int. Cl.
*B60W 30/06* (2006.01)
*B60W 30/095* (2012.01)
*B60W 50/14* (2020.01)

(52) U.S. Cl.
CPC ........ *B60W 30/06* (2013.01); *B60W 30/0956* (2013.01); *B60W 50/14* (2013.01); *B60W 2050/146* (2013.01)

(58) Field of Classification Search
CPC .. B60W 30/06; B60W 30/0956; B60W 50/14; B60W 2050/146
USPC ........................................................... 701/25
See application file for complete search history.

(56) References Cited

U.S. PATENT DOCUMENTS 9,522,661 B2 12/2016 Inoue et al.
9,604,638 B2 3/2017 Kiyokawa et al.
9,738,276 B2 8/2017 Kiyokawa et al.
9,828,028 B2 11/2017 Ishijima et al.
9,836,658 B2 12/2017 Kiyokawa et al.
9,875,655 B2 1/2018 Kiyokawa et al.
10,031,227 B2 7/2018 Kiyokawa et al.
10,150,486 B2 12/2018 Hoshino et al.
10,239,520 B2 3/2019 Tomozawa et al.
10,377,416 B2 8/2019 Fukukawa et al.
11,623,521 B2 * 4/2023 Hara ......................... B60R 1/27 701/26
2016/0180261 A1 * 6/2016 Rosen .................... G06Q 10/02 705/5
2018/0120853 A1 * 5/2018 Seo ...................... G05D 1/0212
(Continued)

FOREIGN PATENT DOCUMENTS

JP 2023-125795 A 9/2023

*Primary Examiner* — Yazan A Soofi
(74) *Attorney, Agent, or Firm* — SoraIP, Inc.

(57) ABSTRACT

A park assist system stores, as a registered travel path, a travel path of a vehicle when causing the vehicle to enter a predetermined parking space or a travel path of the vehicle when causing the vehicle to exit the parking space, and performs automatic park control in which the vehicle is caused to travel autonomously based on the registered travel path, when causing the vehicle to enter or exit the parking space from next time onwards. The park assist system includes a determination unit that determines whether to store the registered travel path as an entry path or an exit path, based on a state of the vehicle when a registration request to store the registered travel path is made, and determines whether to store a travel path of the vehicle immediately before or a travel path of the vehicle immediately after when the registration request is made.

8 Claims, 6 Drawing Sheets

(56) References Cited

U.S. PATENT DOCUMENTS

| | | | | |
|---|---|---|---|---|
| 2019/0016331 | A1* | 1/2019 | Carlson | G05D 1/0088 |
| 2020/0202716 | A1* | 6/2020 | Edwards | G08G 1/096855 |
| 2020/0242924 | A1* | 7/2020 | Publicover | G08G 1/087 |
| 2020/0307616 | A1* | 10/2020 | Nithiyanantham | G02B 27/0093 |
| 2021/0300335 | A1* | 9/2021 | Hara | G06V 20/586 |
| 2021/0300341 | A1* | 9/2021 | Shoda | B60K 35/28 |
| 2023/0005368 | A1* | 1/2023 | Higuchi | G08G 1/141 |
| 2023/0032129 | A1* | 2/2023 | Hidaka | H04W 4/40 |
| 2024/0042991 | A1* | 2/2024 | Yamaguchi | B60W 30/06 |
| 2024/0199090 | A1* | 6/2024 | Sato | B60W 60/0054 |

* cited by examiner

PARK ASSIST SYSTEM

CROSS-REFERENCE TO RELATED APPLICATION

This application claims priority to Japanese Patent Application No. 2024-026695 filed on Feb. 26, 2024, incorporated herein by reference in its entirety.

BACKGROUND

1. Technical Field

The present disclosure relates to park assist systems.

2. Description of Related Art

For example, Japanese Unexamined Patent Application Publication No. 2023-125795 (JP 2023-125795 A) discloses a park assist system that stores, as a target parking space for park assistance, position information of a parking space where a vehicle is frequently parked. The park assist system disclosed in JP 2023-125795 A performs automatic control of park assistance for parking the vehicle in the target parking space, when it detects that the vehicle has approached the target parking space.

SUMMARY

In recent years, path memory park assist systems have been used in practical applications. A path memory park assist system not only registers position information of a parking space but also stores a travel path a vehicle traveled when a driver parked in this parking space. When the vehicle is to be parked in the same parking space from next time onwards, the path memory park assist system causes the vehicle to autonomously drive along the stored travel path. When such a park assist system stores a travel path, it is necessary to identify whether this travel path is a path to enter the parking space or a path to exit the parking space, or whether the travel path to be registered is a travel path the vehicle has traveled immediately before or a travel path that the vehicle is going to travel. Performing these identifications by driver's selection operations is disadvantageous because such operations are complicated enough to bother the driver. That is, it can be said that there is room for improvement in convenience.

The present disclosure was made to solve the above issue, and an object of the present disclosure is to improve convenience by simplifying an operation in path memory park assistance.

A park assist system of the present disclosure is configured to store, as a registered travel path, a travel path of a vehicle when causing the vehicle to enter a predetermined parking space or a travel path of the vehicle when causing the vehicle to exit the parking space, and perform automatic park control when causing the vehicle to enter or exit the parking space from next time onwards. The automatic park control is control in which the vehicle is caused to travel autonomously based on the registered travel path. The park assist system includes a determination unit configured to determine whether to store the registered travel path as an entry path or an exit path, based on a state of the vehicle when a registration request to store the registered travel path is made, and determine whether to store a travel path of the vehicle immediately before or a travel path of the vehicle immediately after when the registration request is made.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a parking assist system according to the present embodiment will be described with reference to the drawings.

Hardware Configuration

Figure 1:
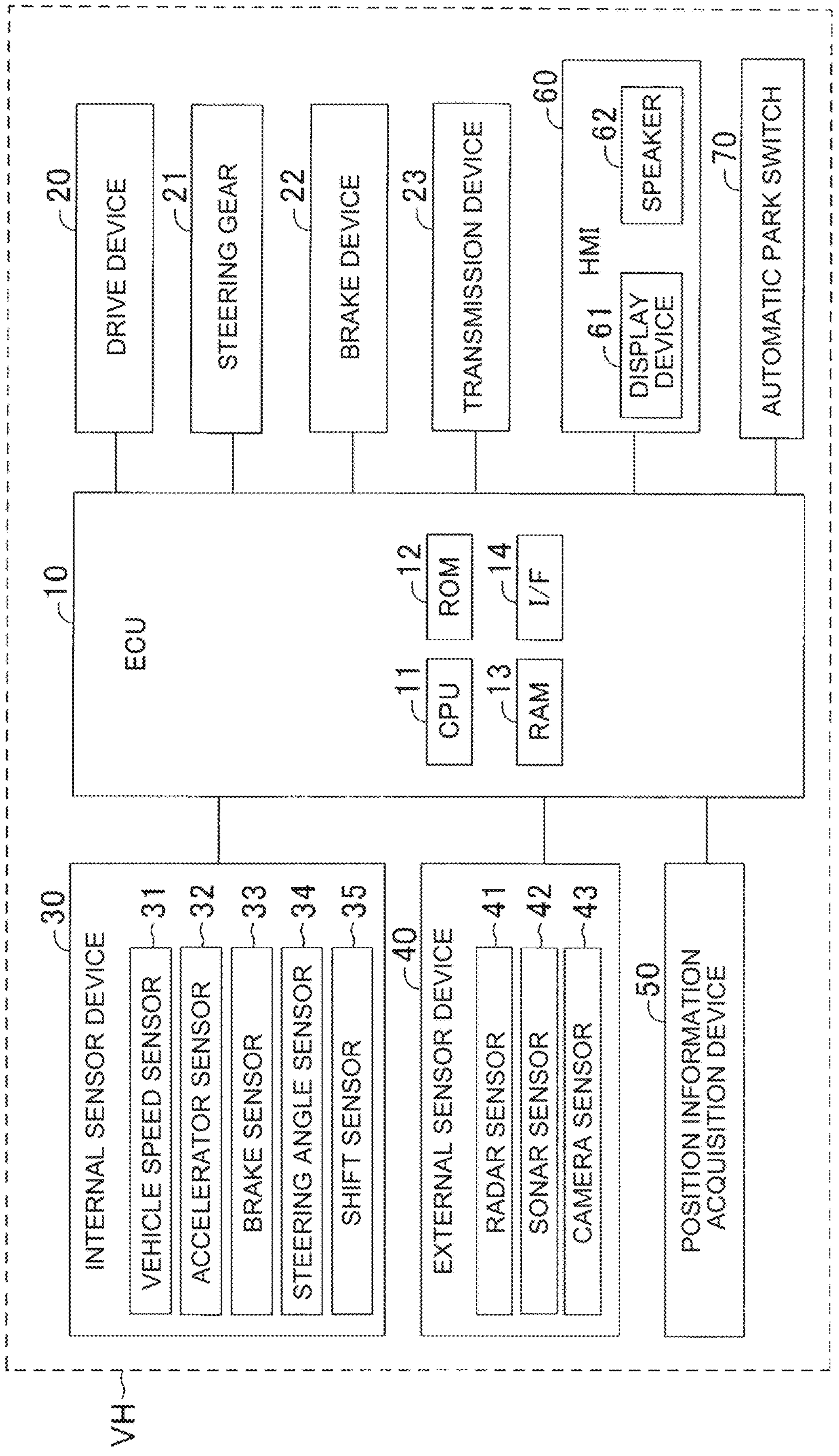
FIG. 1 is a schematic diagram illustrating a hardware configuration of a vehicle according to an embodiment.

FIG. 1 is a schematic diagram illustrating a hardware configuration of a vehicle VH according to the present embodiment. The vehicle VH has ECU (Electronic Control Unit) 10. ECU 10 includes CPU (Central Processing Unit) 11, ROM (Read Only Memory) 12, RAM (Random Access Memory) 13, and interface device 14. CPU 11 is a processor that executes various programs stored in ROM 12. ROM 12 is a non-volatile memory that stores data and the like required for CPU 11 to execute various programs. RAM 13 provides a working area to be deployed when various programs are executed by CPU 11. The interface device 14 is a communication device for communicating with an external device.

ECU 10 is a central device that performs automatic entry control for automatically causing the vehicle VH to enter the parking space and automatic exit control for automatically causing the vehicle VH to exit the parking space (hereinafter, these automatic entry control and automatic exit control may be collectively referred to as "automatic park control"). In the present embodiment, the automatic park control is performed on a parking space registered in advance by the driver, such as a parking space having a relatively high frequency of use. Hereinafter, the parking space that has been registered will be referred to as "registered parking space". The target parking space can be registered as a registered parking space as long as the parking space is not only a parking space whose parking frame is defined by a white line etc, but any parking space in which a space in which a vehicle VH can enter can be secured. The registered parking space is registered by the driver manually acquiring a travel path when the vehicle VH is caused to enter or exit the parking space and storing the acquired travel path in association with the position information of the parking space.

The automatic entry control of the vehicle VH to the registered parking space and the automatic exit control from the registered parking space are performed by causing the vehicle VH to automatically travel along the travel path stored in advance. For this reason, the drive device 20, the steering device 21, the braking device 22, the transmission device 23, the internal sensor device 30, the external sensor device 40, the position information acquisition device 50, HMI (Human Machine Interface) 60, the automatic park switch 70, and the like are communicably connected to ECU 10.

The drive device 20 generates a driving force to be transmitted to the driving wheels of the vehicle VH. Examples of the drive device 20 include an electric motor and an engine. In the present embodiment, the vehicle VH may be any of a hybrid electric vehicle (HEV), a plug-in Hybrid vehicle (PHEV), a fuel cell electric vehicle (FCEV), a battery electric vehicle (BEV), and an engine-driven vehicle. The steering device 21 applies a steering force to the wheels of the vehicle VH. The braking device 22 applies a braking force to the wheels of the vehicle VH. The transmission device 23 is configured to be selectively switchable to a parking range that locks the rotation of the drive wheels, a reverse range that causes the vehicle VH to travel backward, a neutral range that blocks the transmission of power, and a drive range that causes the vehicle VH to travel forward.

The internal sensor device 30 is a sensor for detecting the condition of VH. Specifically, the internal sensor device 30 includes a vehicle speed sensor 31, an accelerator sensor 32, a brake sensor 33, a steering angle sensor 34, a shift sensor 35, and the like. The vehicle speed sensor 31 detects the traveling speed of the vehicle VH, that is, the vehicle speed. The accelerator sensor 32 detects an operation amount of an accelerator pedal (not shown) by a driver. The brake sensor 33 detects an operation amount of a brake pedal (not shown) by the driver. The steering angle sensor 34 detects a rotation angle of a steering wheel or a steering shaft (not shown), that is, a steering angle. The shift sensor 35 detects a shift position (parking position P, reverse position R, neutral position N, drive position D, and the like) of the transmission device 23. The internal sensor device 30 transmits the condition of the vehicle VH detected by the sensors 31 to 35 to ECU 10 at a predetermined cycle.

The external sensor device 40 is a sensor or the like that recognizes target information related to a target in the vicinity of VH. Specifically, the external sensor device 40 includes a radar sensor 41, a sonar sensor 42, a camera sensor 43, and the like. The radar sensor 41 includes a millimeter wave radar and/or a lidar. The millimeter-wave radar radiates a radio wave in a millimeter-wave band, and receives a reflected wave reflected by a target existing in the radiation range, thereby obtaining a relative distance, a relative velocity, and the like between the vehicle VH and the target. The lidar sequentially scans the pulsed laser beam having a wavelength shorter than the millimeter wave toward a plurality of directions, and receives the reflected light reflected by the target, thereby obtaining a shape of the target, a relative distance between the vehicle VH and the target, a relative velocity, and the like. The sonar sensor 42 emits an ultrasonic wave and receives a reflected wave reflected by a target existing in the emission area, thereby obtaining a relative distance, a relative velocity, and the like between the vehicle VH and the target. The camera sensor 43 is, for example, a stereo camera or a monocular camera, and a digital camera having an image sensor such as a CMOS or a CCD can be used. The camera sensor 43 processes the captured image data to acquire the shape of the target object, the relative distance between the vehicle VH and the target object, the relative speed, and the like. The external sensor device 40 transmits the acquired target object data to ECU 10 at a predetermined cycle. Note that the external sensor device 40 does not necessarily have to include all of the radar sensor 41, the sonar sensor 42, and the camera sensor 43, and may include, for example, only the camera sensor 43.

The position information acquisition device 50 acquires the present position information of the vehicle VH. As the position-information acquisition device 50, for example, a GPS (Global Positioning System), GNSS (Global Navigation Satellite System) or the like included in a navigation device (not shown) can be used. The position information acquisition device 50 sends the acquired present position information of the vehicle VH to ECU 10 at a predetermined cycle.

HMI 60 is an interface for inputting and outputting data between ECU 10 and drivers, and includes an input device and an output device. Examples of the input device include a touch panel type liquid crystal display, a switch, and a sound pickup microphone. Examples of the output device include a display device 61 and a speaker 62. The display device 61 is, for example, a center display, a multi-information display, or the like. The speaker 62 is, for example, a speaker of an acoustic system or a navigation system.

The automatic park switch 70 is, for example, a switch provided in a center console, an instrument panel, or the like of the vehicle VH and ON operated by an occupant (for example, a driver) of the vehicle VH. When the automatic park switch 70 is turned ON, ECU 10 receives the automatic park start request. Note that the automatic park switch 70 is not limited to the physical switch, and may be a touch-type switch image displayed on the display device 61. In addition, the automatic park start request may be acquired by voice recognition using a voice collection microphone or may be acquired by gesture recognition using a driver camera.

Software Configuration

Figure 2:
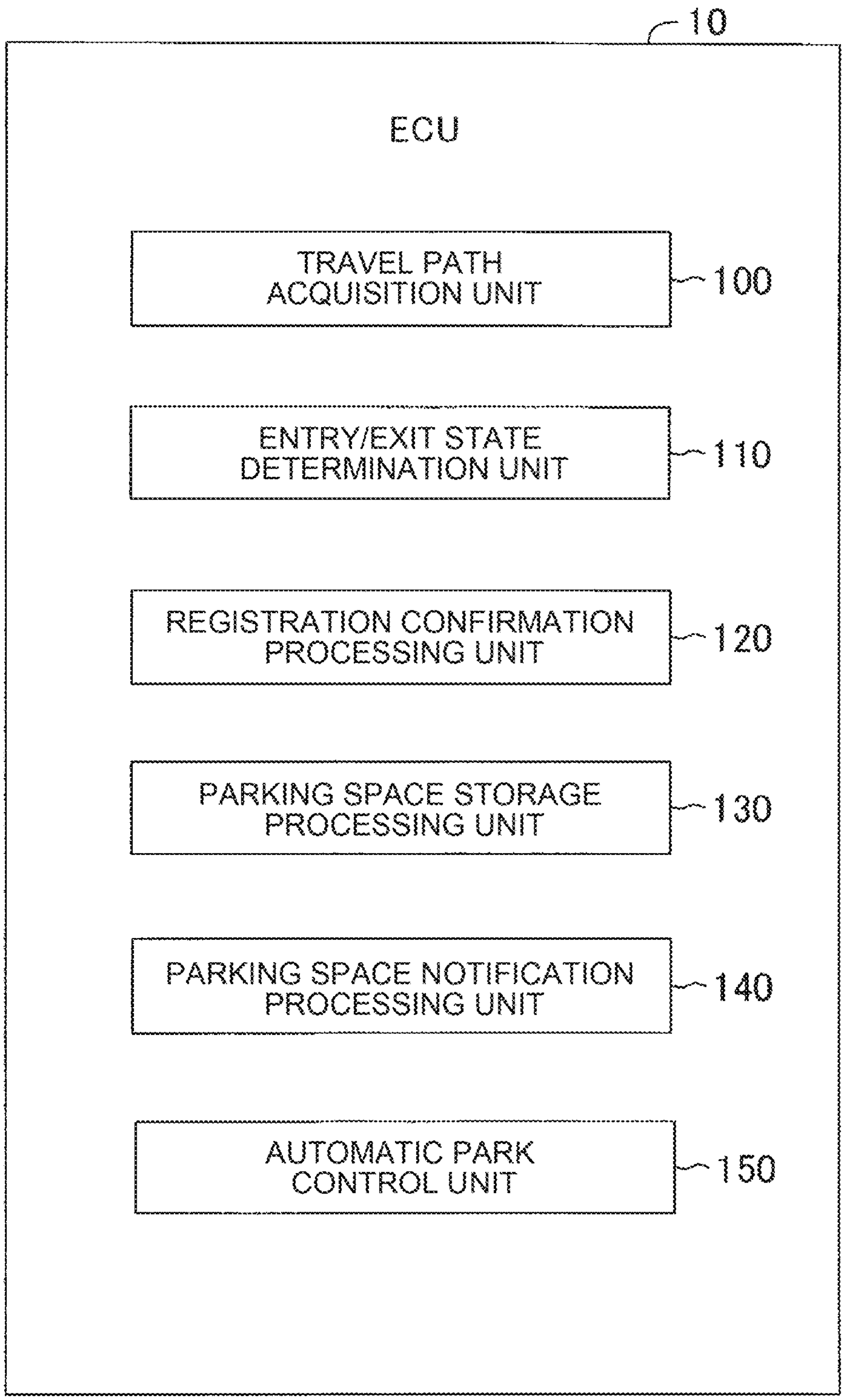
FIG. 2 is a schematic diagram illustrating a software configuration of a control device according to the embodiment.

FIG. 2 is a schematic diagram illustrating a software configuration of ECU 10 according to the present embodiment. As illustrated in FIG. 2, ECU 10 includes, as functional elements, a travel path acquisition unit 100, an entry/exit state determination unit 110, a registration confirmation processing unit 120, a parking space storage processing unit 130, a parking space notification processing unit 140, an automatic park control unit 150, and the like. These functional elements 100 to 150 are realized by CPU 11 of ECU 10 reading a program stored in ROM 12 into a RAM 13 and executing the program. Note that all or a part of the functional elements 100 to 150 may be provided in another ECU separate from ECU 10 or in an information processing device of a facility (e.g., a control center) capable of communicating with the vehicle VH.

The travel path acquisition unit 100 acquires a travel path of the vehicle VH at the nearest predetermined distance, and temporarily stores the travel path in, for example, a RAM 13. The travel path acquisition unit 100 sequentially deletes the travel paths acquired prior to the predetermined distance and stored in RAM 13 or the like as the new travel path is acquired. When the power switch (or the ignition switch) of the vehicle VH is turned OFF, the travel path acquisition unit 100 deletes (resets) all the travel paths stored in RAM 13 or the like. The predetermined distance is not particularly limited, but may be set based on a distance (e.g., several tens of meters) required for the vehicle VH to enter or exit the predetermined parking space.

Here, the travel path of the vehicle VH refers to a moving trajectory of the vehicle position that changes as the vehicle VH travels. The vehicle position is, for example, a predetermined geometric center position in a plan view of the vehicle VH. The vehicle position may be another position of the vehicle VH (for example, a center position of the left and right front wheels or a center position of the left and right rear wheels). The moving trajectory of the vehicle VH may be acquired, for example, by odometry based on the detection results of the vehicle speed sensor 31 and the steering angle sensor 34. Alternatively, the moving trajectory of the vehicle VH may be used in combination with the position information of the vehicle VH acquired by the position information acquisition device 50. Alternatively, the moving trajectory of the vehicle VH may be acquired by optical flow based on road surface images or the like of the surroundings of the vehicle VH captured by the camera sensor 43.

Upon receiving the registration start request from the driver, the entry/exit state determination unit 110 performs the entry/exit state determination process. The entry/exit state determination process determines whether the vehicle VH is in the "pre-entry state" immediately before the vehicle VH enters the predetermined parking space, or is in the "pre-exit state" immediately before the vehicle VH exits the predetermined parking space, or is in the "post-entry state" immediately after the vehicle VH enters the predetermined parking space, or is in the "post-exit state" immediately after the vehicle VH exits the predetermined parking space. The driver registration start request may be acquired based on, for example, a touch operation of a switch image displayed on the display device 61. Alternatively, it is only necessary to acquire the registration start request from the driver based on an operation of turning on a physical switch provided in a center console, an instrument panel, or the like. Alternatively, the registration start request from the driver may be acquired on the basis of voice recognition by the voice pickup microphone or the like. Details of the entry/exit state determination processing performed by the entry/exit state determination unit 110 will be described below.

When the registration start request from the driver is received, the entry/exit state determination unit 110 determines that the vehicle VH is in the "post-entry state" when the first specific condition is satisfied. The first specific condition is that the shift position is the parking position P and there is a travel history (a travel path acquired by the travel path acquisition unit 100) immediately before. When receiving the registration start request from the driver, if the second specific condition is satisfied, the entry/exit state determination unit 110 determines that the vehicle VH is in the "pre-exit state". The second specific condition is that the shift position is the parking position P and there is no travel history (travel path acquired by the travel path acquisition unit 100) immediately before. When the third specific condition is satisfied upon receipt of the registration-start request from the driver, the entry/exit state determination unit 110 determines that the vehicle VH is in the "post-exit state". The third specific condition is that the shift position is a position other than the parking position P (for example, the drive position D), and the travel distance of the vehicle VH after the shift position is switched from the parking position P is less than or equal to the predetermined threshold distance. When the fourth specific condition is satisfied upon receipt of the registration start request from the driver, the entry/exit state determination unit 110 determines that the vehicle VH is in the "pre-entry state". The fourth specific condition is that the condition of the vehicle VH does not correspond to any of the first specific condition, the second specific condition, and the third specific condition. When the fourth specific condition is satisfied, specifically, the shift position is a position other than the parking position P, and the travel distance of the vehicle VH after the shift position is switched from the parking position P exceeds a predetermined threshold distance.

Here, a case where a registration start request is made after the driver switches the shift position to the parking position P will be considered. In a case where the period from the switching to the parking position P to the registration start request is short (for example, several seconds), it is estimated that the driver desires to register the immediately preceding travel path as the entry path. However, when the period from the switch to the parking position P to the registration start request is relatively long (for example, several tens of seconds, several minutes), it is estimated that the driver does not register the entry path, but wants to register the exit path for driving the vehicle VH. Such scenes include, for example, a case where the driver restarts after stopping the vehicle VH on the road shoulder, a case where the driver parks the vehicle VH in a parking lot such as a shop, and then restarts without turning off the power switch. Even when the shift position is the parking position P and there is a travel history (travel path acquired by the travel path acquisition unit 100) immediately before, the entry/exit state determination unit 110 determines that the vehicle VH is in the "pre-exit state" when the fifth specific condition is satisfied. The fifth specific condition is that a predetermined time or more has elapsed from the time when the shift position is switched to the parking position P until the reception of the registration start request of the driver.

The registration confirmation processing unit 120 performs registration confirmation processing for displaying a registration confirmation screen of the registration mode corresponding to the determination result from the entry/exit state determination unit 110 on the display device 61. Details of the registration confirmation processing performed by the registration confirmation processing unit 120 will be described below.

Figure 3:
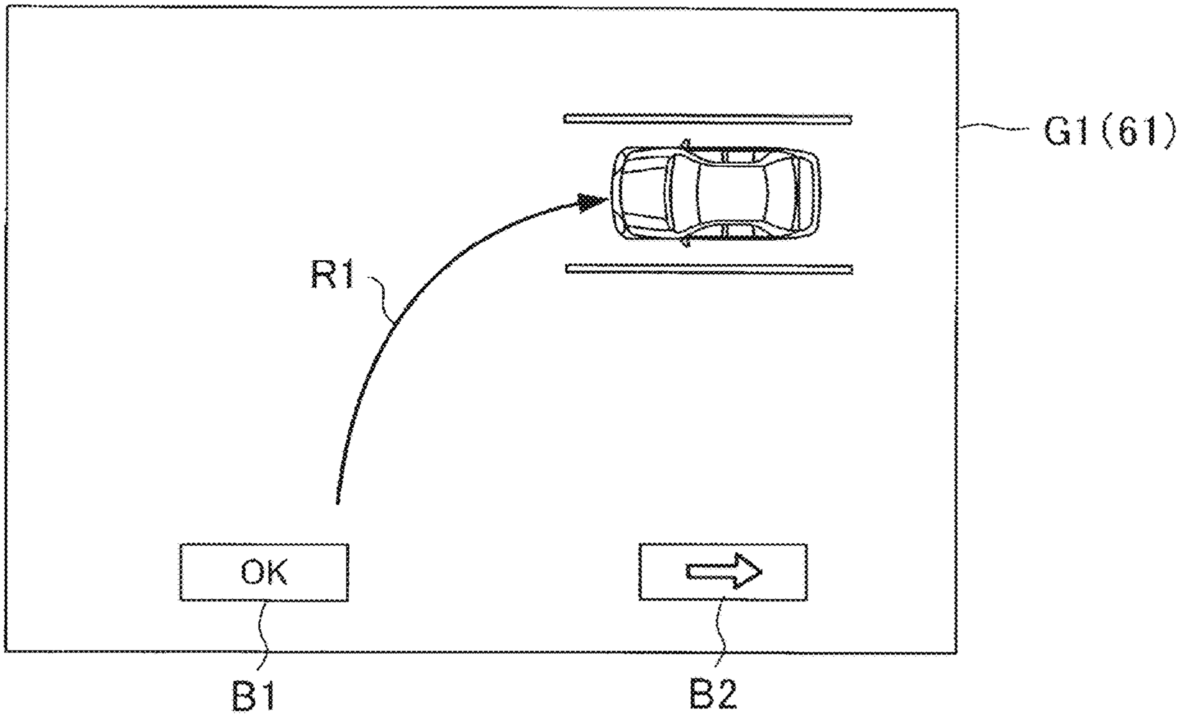
FIG. 3 is a schematic diagram illustrating an example of a registration confirmation screen according to the embodiment.

The registration confirmation processing unit 120 displays the post-entry registration confirmation screen G1 shown in FIG. 3 on the display device 61 when the entry/exit state determination unit 110 determines that the post-entry state is satisfied (that is, when the first specific condition is satisfied). The post-entry registration confirmation screen G1 includes, for example, an entry path R1 schematically showing a part required for entry of the latest travel path stored in RAM 13 or the like by the travel path acquisition unit 100, an entry registration confirmation button B1, and a switching button B2. When the driver touches the entry registration confirmation button B1, the registration confirmation processing unit 120 transmits a registration command for storing the entry path R1 in association with the position information of the parking space to the parking space storage processing unit 130. On the other hand, when the driver touches the switching button B2, the registration confirmation processing unit 120 displays a registration confirmation screen of another registration mode on the display device 61. The registration confirmation screen of another registration mode is, for example, a post-exit registration confirmation screen G2, a pre-exit registration confirmation screen G3A, and a pre-entry registration confirmation screen G4A, which will be described later.

As described above, when the entry/exit state determination unit 110 determines the post-entry state, a post-entry registration confirmation screen G1 including the post-entry registration confirmation button B1 and the entry path R1 is displayed on the display device 61. As a result, the driver can easily perform the entry registration without selecting whether the registration operation is before or after entry, or whether the travel path is the entry path or the exit path. That is, it becomes possible to simplify the operation necessary for the entry registration, it is possible to reliably improve the convenience. In addition, even when the entry/exit state determination unit 110 determines that the state is the post-entry state, the actual intention of the driver may differ from that of the driver, for example, when the driver is scheduled to restart the vehicle VH. In such cases, the display device 61 displays the registration confirmation screen of the other registration mode in response to the touch operation of the switching button B2 of the driver, so that the presentation of the registration mode suitable for the driver's intention can be realized.

Figure 4:
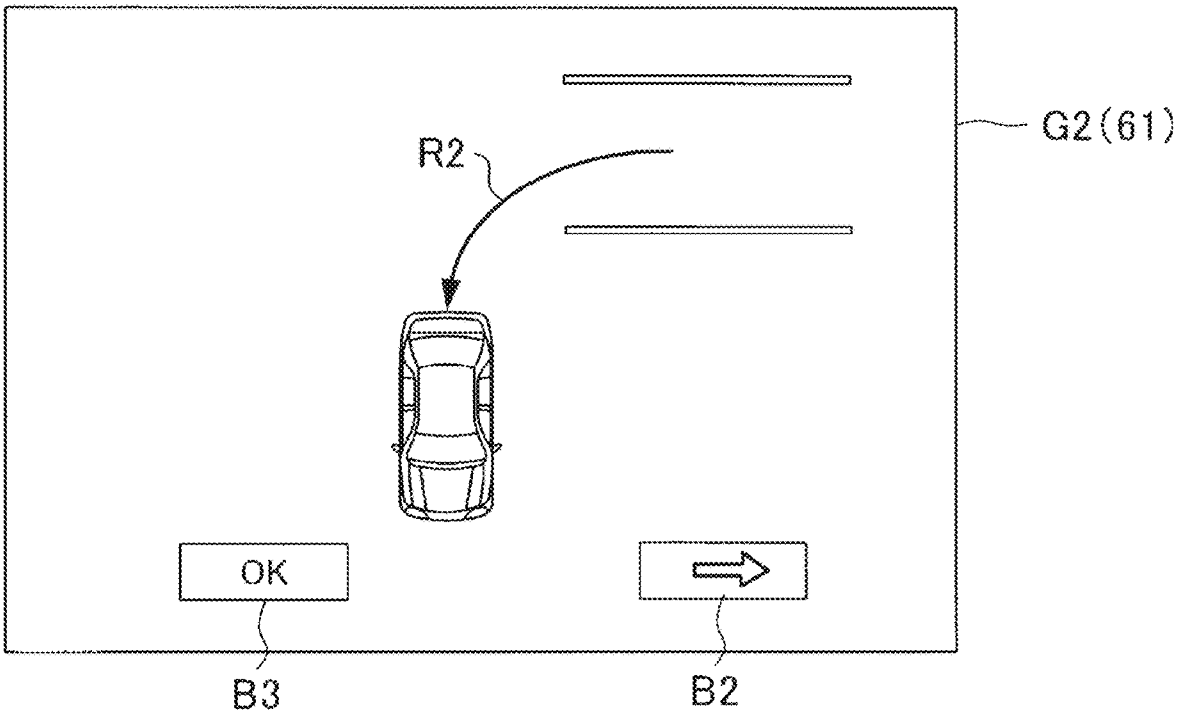
FIG. 4 is a schematic diagram illustrating an example of a registration confirmation screen according to the embodiment.

The registration confirmation processing unit 120 displays, on the display device 61, the post-exit registration confirmation screen G2 shown in FIG. 4 when the entry/exit state determination unit 110 determines that the post-exit state is satisfied (that is, when the third specific condition is satisfied). The post-exit registration confirmation screen G2 includes, for example, an exit path R2 schematically showing a portion required to exit the most recent travel path stored in RAM 13 or the like by the travel path acquisition unit 100, an exit registration confirmation button B3, and a switching button B2. When the driver touches the exit registration confirmation button B3, the registration confirmation processing unit 120 transmits a registration command for storing the exit path R2 in association with the position information of the parking space to the parking space storage processing unit 130. On the other hand, when the driver touches the switching button B2, the registration confirmation processing unit 120 displays the registration confirmation screen G1, G3A, G4A of another registration mode on the display device 61.

In this way, when the entry/exit state determination unit 110 determines the post-exit state, the display device 61 displays the post-exit registration confirmation screen G2 including the exit registration confirmation button B3 and the exit path R2. As a result, the driver can easily perform the exit registration without selecting whether the registration operation is before or after the exit, or whether the travel path is the entry path or the exit path. That is, it is possible to simplify the operation necessary for the exit registration, it is possible to reliably improve the convenience. Even when the entry/exit state determination unit 110 determines that the state is the post-exit state, there is a case where the actual intention of the driver is different from that of the driver, such as a case where the driver is scheduled to reenter. In such cases, the display device 61 displays the registration confirmation screen of the other registration mode in response to the touching operation of the switching button B2, so that the presentation of the registration mode suitable for the driver's intention can be realized.

Figure 5A:
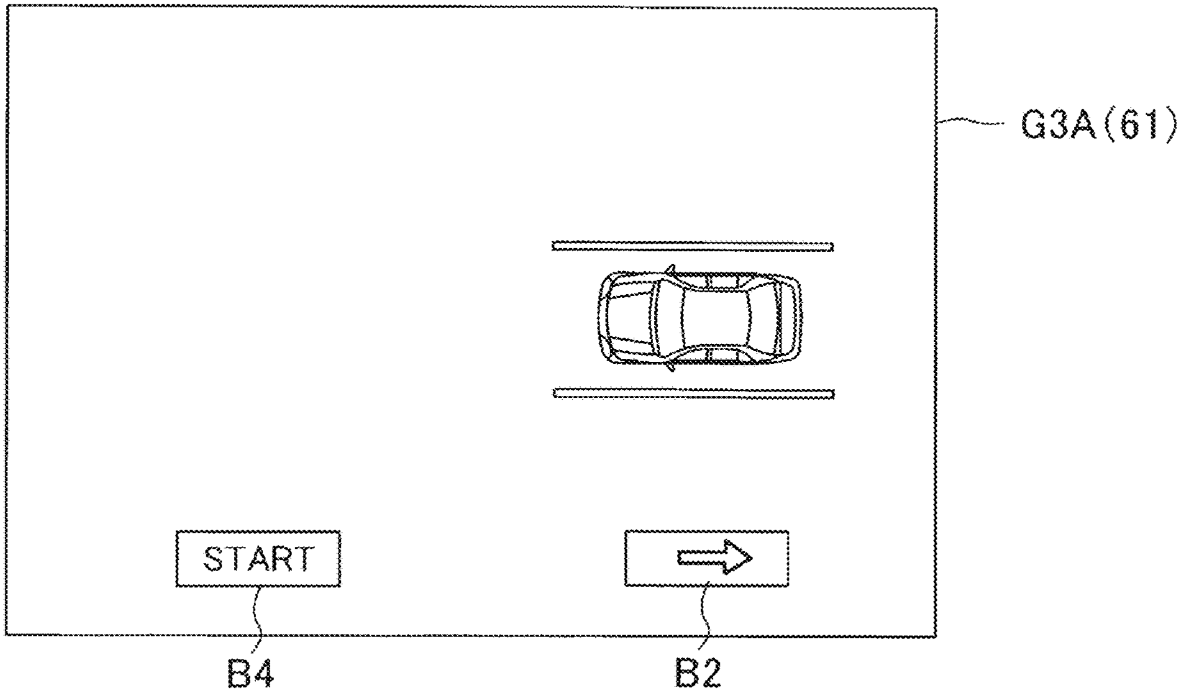
FIG. 5A is a schematic diagram illustrating a registration confirmation screen according to the embodiment.

The registration confirmation processing unit 120 displays, on the display device 61, the pre-exit registration confirmation screen G3A shown in FIG. 5A when the entry/exit state determination unit 110 determines that the pre-exit state (that is, when the second specific condition or the fifth specific condition is satisfied). The pre-exit registration confirmation screen G3A includes, for example, an exit registration starting button B4 and a switching button B2. When the driver touches the exit registration starting button B4, the registration confirmation processing unit 120 sends a command to acquire a travel path and store it in the RAM 13 etc. to the travel path acquisition unit 100. On the other hand, when the driver touches the switching button B2, the registration confirmation processing unit 120 displays the registration confirmation screen G1, G2, G4A of another registration mode on the display device 61.

As described above, when the entry/exit state determination unit 110 determines that the pre-exit state, a pre-exit registration confirmation screen G3A including the exit registration starting button B4 is displayed on the display device 61. Thus, the driver can easily start the exit registration without selecting whether the registration operation is before or after exit. That is, it is possible to simplify the operation necessary to start the exit registration, it is possible to reliably improve the convenience. In addition, even when the entry/exit state determination unit 110 determines that the state is the pre-exit state, there is a case in which the actual intention of the driver is different. In such cases, the display device 61 displays the registration confirmation screen of the other registration mode in response to the touching operation of the switching button B2, so that the presentation of the registration mode suitable for the driver's intention can be realized.

Figure 5B:
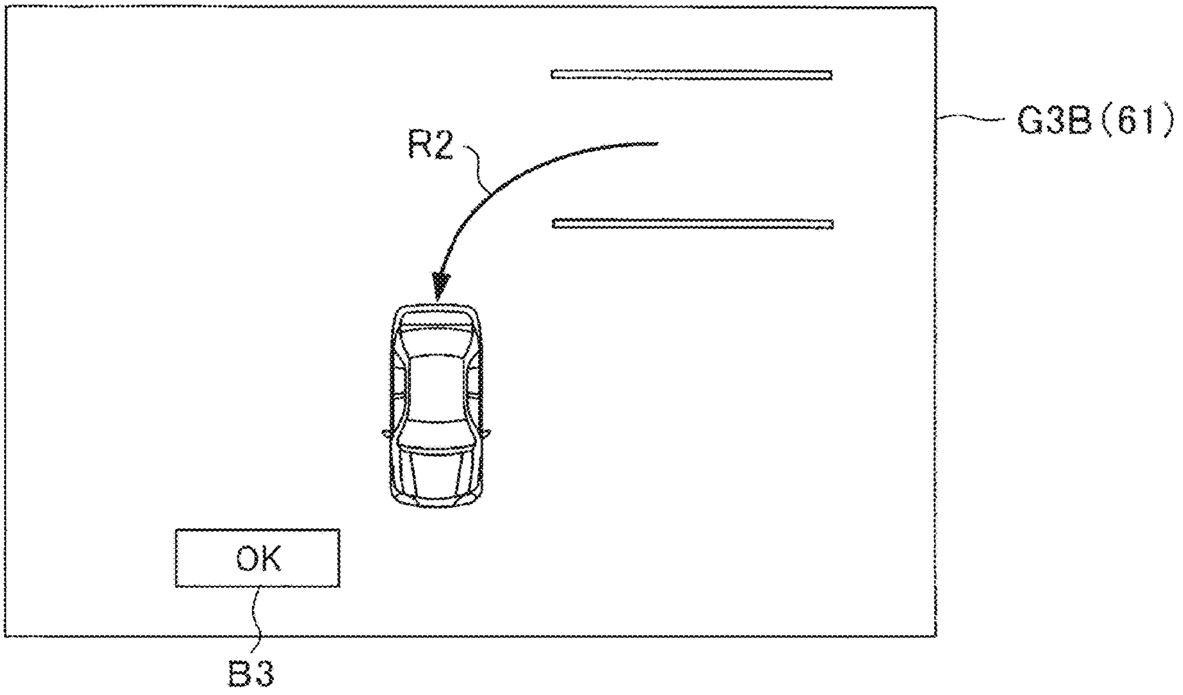
FIG. 5B is a schematic diagram illustrating a registration confirmation screen according to the embodiment.

When the exit completion condition of the vehicle VH is satisfied, the registration confirmation processing unit 120 displays the exit completion confirmation screen G3B shown in FIG. 5B on the display device 61. The exit completion confirmation screen G3B includes, for example, an exit path R2 schematically showing a part required to exit the most recent travel path stored in RAM 13 or the like by the travel path acquisition unit 100, and an exit registration confirmation button B3. The exit completion condition may be established, for example, when the travel distance from the start of exit of the vehicle VH reaches a predetermined threshold distance or when the driver touches an exit end button (not shown) displayed on the display device 61 after the vehicle VH starts to exit. When the driver touches the exit registration confirmation button B3 on the exit completion confirmation screen G3B, the registration confirmation processing unit 120 transmits a registration command for storing the exit path R2 in association with the position information of the parking space to the parking space storage processing unit 130.

In this way, the entry/exit state determination unit 110 determines the pre-exit state, and when the exit completion condition is satisfied, the exit completion confirmation screen G3B including the exit registration confirmation button B3 and the exit path R2 is displayed on the display device 61. As a result, the driver can easily perform the exit registration without selecting whether the travel path is the entry path or the exit path. That is, it is possible to simplify the operation necessary for the exit registration, it is possible to reliably improve the convenience.

Figure 6A:
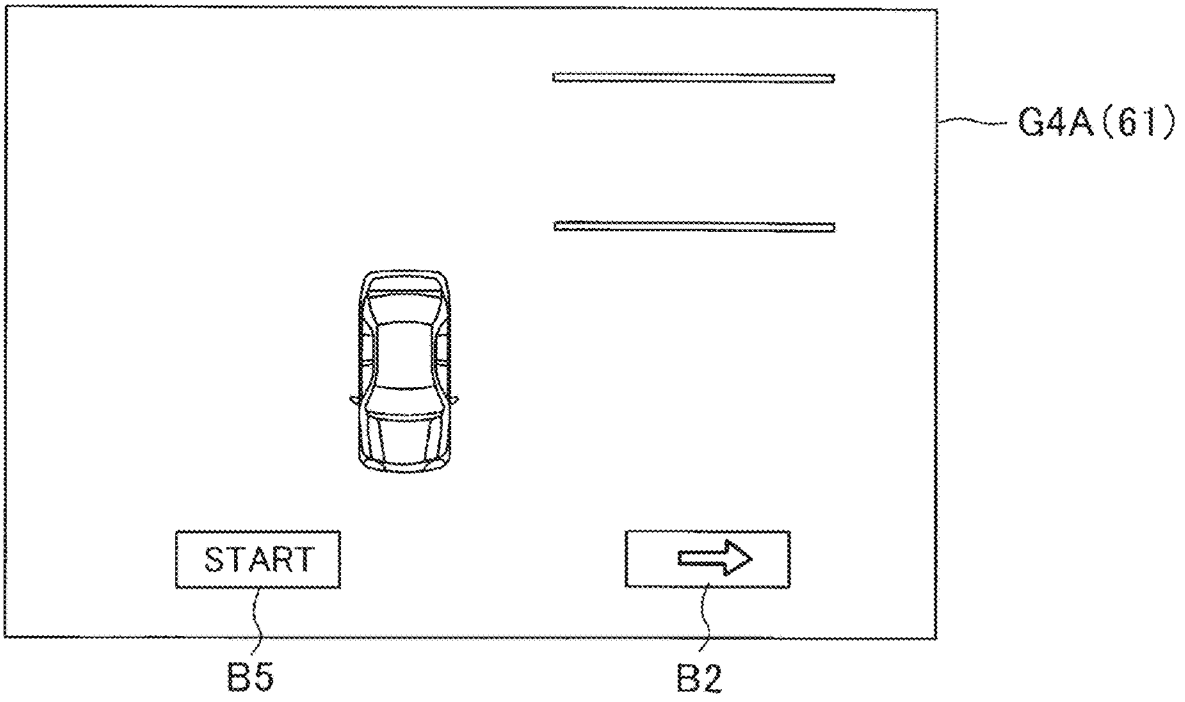
FIG. 6A is a schematic diagram illustrating a registration confirmation screen according to the embodiment.

The registration confirmation processing unit 120 displays the pre-entry registration confirmation screen G4A shown in FIG. 6A on the display device 61 when the entry/exit state determination unit 110 determines that the pre-entry state is satisfied (that is, when the fourth specific condition is satisfied). The pre-entry registration confirmation screen G4A includes, for example, an entry registration starting button B5 and a switching button B2. When the driver touches the entry registration starting button B5, the registration confirmation processing unit 120 sends a command to acquire the travel route and store it in the RAM 13 to the travel path acquisition unit 100. On the other hand, when the driver touches the switching button B2, the registration confirmation processing unit 120 displays a registration confirmation screen of another registration mode on the display device 61.

As described above, when the entry/exit state determination unit 110 determines the pre-entry state, the pre-entry registration confirmation screen G4A including the entry registration starting button B5 is displayed on the display device 61. As a result, the driver can easily start the entry registration without selecting whether the registration operation is before or after entry. That is, it is possible to simplify the operation necessary for starting the entry registration, it is possible to reliably improve the convenience. Further, even when the entry/exit state determination unit 110 determines that the state is the pre-entry state, there is a case where the actual intention of the driver is different. In such cases, the display device 61 displays the registration confirmation screen of the other registration mode in response to the touching operation of the switching button B2, so that the presentation of the registration mode suitable for the driver's intention can be realized.

Figure 6B:
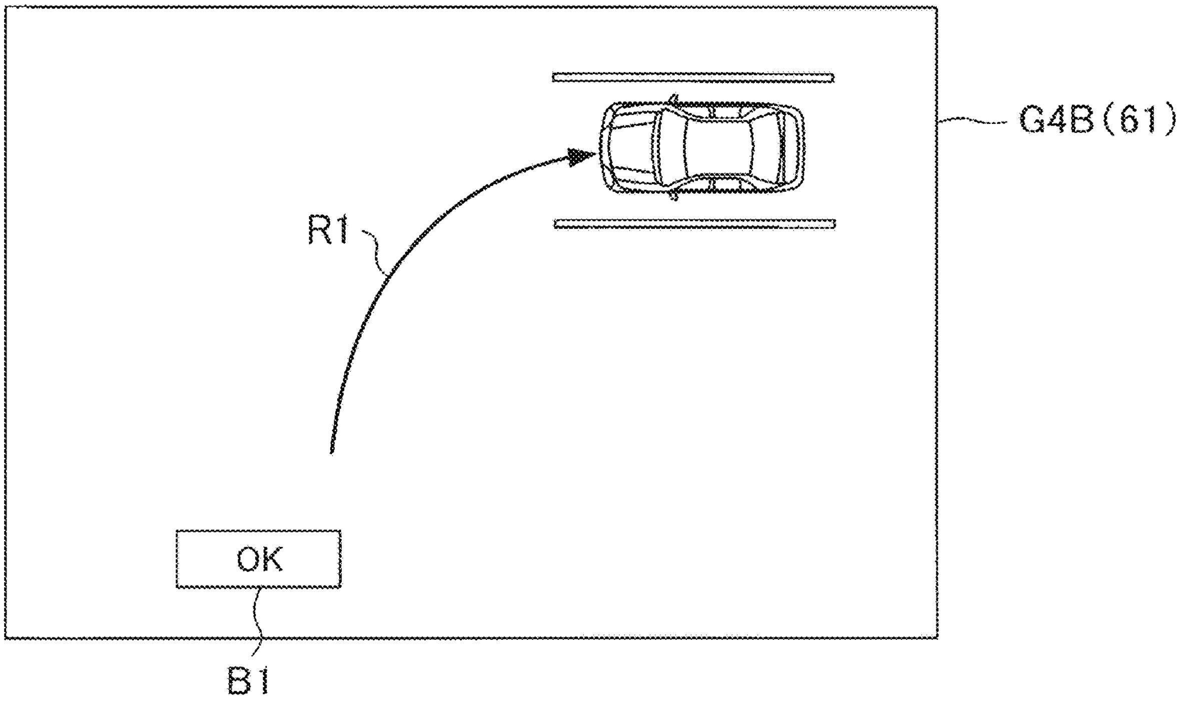
FIG. 6B is a schematic diagram illustrating a registration confirmation screen according to the embodiment.

When the entry completion condition of the vehicle VH is satisfied, the registration confirmation processing unit 120 displays the entry completion confirmation screen G4B shown in FIG. 6B on the display device 61. The entry completion confirmation screen G4B includes, for example, an entry path R1 schematically showing a portion required for entry out of the most recent travel path stored in RAM 13 or the like by the travel path acquisition unit 100, and an entry registration confirmation button B1. The entry completion condition may be established, for example, when the shifting position of the vehicle VH is switched to the parking position P. When the driver touches the entry registration confirmation button B1 on the entry completion confirmation screen G4B, the registration confirmation processing unit 120 transmits a registration command for storing the entry path R1 in association with the position information of the parking space to the parking space storage processing unit 130.

As described above, when the entry/exit state determination unit 110 determines the pre-entry state and the entry completion condition is satisfied, the entry completion confirmation screen G4B including the entry path R1 is displayed on the display device 61. As a result, the driver can easily perform the entry registration without selecting whether the travel path is the entry path or the exit path. That is, it becomes possible to simplify the operation necessary for the entry registration, it is possible to reliably improve the convenience.

Upon receiving the registration command from the registration confirmation processing unit 120, the parking space storage processing unit 130 performs a parking space storage process of storing the position information of the parking space as a registered parking space in association with the entry path R1 and the exit path R2, for example, in a storage medium such as a ROM 12. For example, the position information of the vehicle VH acquired by the position information acquisition device 50 may be used as the position information of the parking space.

When the distance between the current position of the vehicle VH and the registered parking space becomes equal to or less than the predetermined distance based on the detection result from the position information acquisition device 50, the parking space notification processing unit 140 performs a notification process of notifying the occupant of the vehicle VH that the registered parking space has been detected. The notification to the occupant may be performed by, for example, a display on the display device 61 or a sound from the speaker 62.

When the parking space notification processing unit 140 performs the notification process and the automatic park switch 70 is turned on by the occupant of the vehicle VH (for example, a driver), the automatic park control unit 150 causes the vehicle VH to travel along the target travel path with the entry path R1 or the exit path R2 stored in association with the registered parking lot as the target travel path. Accordingly, automatic park control is performed in which the vehicle VH is automatically caused to enter the registered parking space or is automatically caused to exit the registered parking space. Automatic park control is performed by, for example, feedback-controlling the operation of the drive device 20, the steering device 21, or the like based on the deviation between the target travel path and the actual travel path of the vehicle VH. The actual moving trajectory of the vehicle VH may be acquired, for example, by odometry based on the detection results of the vehicle speed sensor 31 and the steering angle sensor 34. Alternatively, the actual moving trajectory of the vehicle VH may be used in combination with the position information of the vehicle VH acquired by the position information acquisition device 50. Alternatively, the actual moving trajectory of the vehicle VH may be acquired by optical flow based on road surface images or the like of the surroundings of the vehicle VH captured by the camera sensor 43.

Figure 7:
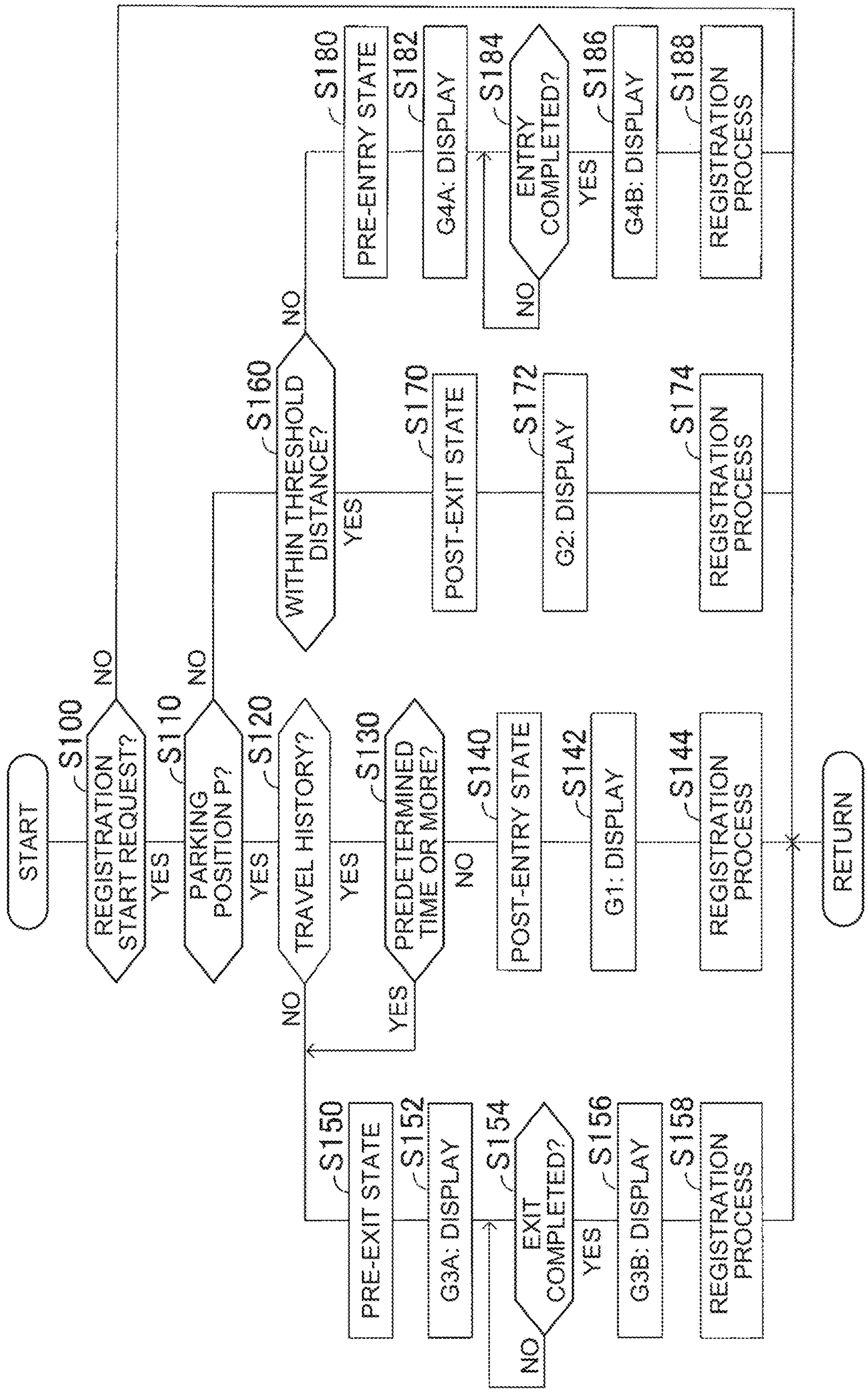
FIG. 7 is a flowchart for explaining routines of the entry/exit state determination process and the registration confirmation process according to the present embodiment.

Next, based on the flow chart shown in FIG. 7, the routine of the entry/exit state determination process and the registration confirmation process that are performed by the CPU 11 of the ECU 10 will be described. In the following description, for the sake of convenience, a case in which the driver does not touch the switching button B2 of the registration-confirmation screen displayed on the display device 61 will be described.

In S100, ECU 10 determines whether or not a register-start-request has been received from the drivers. When the register start-request is received (Yes), ECU 10 proceeds to S110 process. On the other hand, if the register start-request is not accepted (No), ECU 10 returns this routine.

In S110, ECU 10 determines whether the shifting position is the parking position P. If the shifting position is the parking position P (Yes), ECU 10 proceeds to S120 process. On the other hand, if the shifting position is not the parking position P (No), ECU 10 proceeds to S160 process.

When the process proceeds from S110 to S120 process, ECU 10 determines whether or not there is a travel history (travel path acquired by the travel path acquisition unit 100). If there is a travel history (Yes), ECU 10 proceeds to S130 process. On the other hand, if there is no travel history (No), ECU 10 proceeds to S150 process.

When the process proceeds from S120 to S150 process, ECU 10 determines that the vehicle VH is in the "pre-exit state" immediately before the vehicle exits the predetermined parking space (second specific condition is satisfied). Next, in S152, ECU 10 displays the pre-exit registration confirmation screen G3A on the display device 61. When the driver touches the exit registration starting button B4, ECU 10 proceeds to S154 process and determines whether the exit completion condition is satisfied. When the exit completion condition is not satisfied (No), ECU 10 returns to S154 process. On the other hand, when the exit completion condition is satisfied (Yes), ECU 10 proceeds to S156 process.

In S156, ECU 10 displays the exit completion confirmation screen G3B on the display device 61. When the driver touches the exit registration confirmation button B3, ECU 10 proceeds to S158 process, performs a registration process of storing the exit path R2 in association with the position information of the parking space, and returns this routine.

When proceeding from S120 to S130 process, ECU 10 determines whether or not a predetermined period or more has elapsed from when the shift position is switched to the parking position P until the driver registration start request is received. When the predetermined period or more has elapsed (Yes), that is, when the fifth specific condition is satisfied, ECU 10 proceeds to S150 process. On the other hand, when the predetermined period or more has not elapsed (No), ECU 10 proceeds to S140 process.

When the process proceeds from S130 to S140 process, ECU 10 determines that the vehicle VH is in the "post-entry state" immediately after entering the predetermined parking space (first specific condition is satisfied). Next, in S142, ECU 10 displays the post-entry registration confirmation screen G1 on the display device 61. When the driver touches the entry registration confirmation button B1, the ECU 10 proceeds to S144 process, performs a registration process of storing the entry path R1 in association with the position information of the parking space, and returns this routine.

When the process proceeds from S110 to S160 process, ECU 10 determines whether or not the travel distance of the vehicle VH after the shift position is switched from the parking position P is less than or equal to a predetermined threshold distance. If the travel distance is less than or equal to the predetermined threshold distance (Yes), ECU 10 proceeds to S170 process. On the other hand, if the travel distance is not less than the predetermined threshold distance (No), ECU 10 proceeds to S180 process.

When the process proceeds from S160 to S170 process, ECU 10 determines that the vehicle VH is in the "post-exit state" immediately after the vehicle exits the predetermined parking space (third specific condition is satisfied). Next, in S172, ECU 10 displays the post-exit registration confirmation screen G2 on the display device 61. When the driver touches the exit registration confirmation button B3, ECU 10 proceeds to S174 process, performs a registration process of storing the exit path R2 in association with the position information of the parking space, and returns this routine.

When the process proceeds from S160 to S180 process, ECU 10 determines that the vehicle VH is in the "pre-entry condition" immediately before the vehicle enters the predetermined parking space (fourth specific condition is satisfied). Next, in S182, ECU 10 displays the pre-entry registration confirmation screen G4A on the display device 61. When the driver touches the entry registration starting button B5, ECU 10 proceeds to S184 process and determines whether the entry completion condition is satisfied. When the entry completion condition is not satisfied (No), ECU 10 returns to S184 process. On the other hand, when the entry completion condition is satisfied (Yes), ECU 10 proceeds to S186 process.

In S186, ECU 10 displays the entry completion confirmation screen G4B on the display device 61. When the driver touches the entry registration confirmation button B1, ECU 10 proceeds to S188 process, performs a registration process of storing the entry path R1 in association with the position information of the parking space, and returns this routine.

It should be noted that the present disclosure is not limited to the above-described embodiments, and various modifications can be made without departing from the scope of the present disclosure.

For example, in the above embodiment, the driver performs the registration start request, but it is also possible to configure the system side to perform the registration start request. For example, when the position information of the parking space that the vehicle VH is caused to enter or exit, and the vehicle VH is caused to enter the parking space that is frequently used, or when the vehicle VH is caused to exit the parking space, a registration start request is made on the system side without requiring the driver's operations, and the registration confirmation screen described above is displayed on the display device 61. With this configuration, it is possible to further reduce the operation load of the driver related to registration. The present disclosure can also be applied to an autonomous vehicle that automatically performs some or all of the driving operations.

What is claimed is:

1. A park assist electronic control unit (ECU) for a vehicle, the ECU comprising:

a memory configured to store a travel path of the vehicle; and a processor configured to execute the following processes in the order of (i) to (iv):

(i) receiving a registration request from a driver of the vehicle to store the travel path associated with a parking space;

(ii) determining, based on a state of the vehicle when the registration request is received, both of whether the travel path is an entry path or an exit path, and whether to store the travel path immediately before the registration request is received or the travel path immediately after the registration request is received, wherein the state of the vehicle includes a shift position of the vehicle and whether there is the travel path immediately before the registration request is received;

(iii) storing the travel path determined in process (ii) into the memory as either the entry path or the exit path in accordance with the determination made in process (ii); and (iv) performing automatic park control to autonomously follow the travel path to enter into or exit from the parking space.

2. The park assist ECU according to claim 1, wherein the processor is further configured to display a confirmation screen of a registration mode according to a determination result from the processor on a display device installed in a driver's cabin of the vehicle.

3. The park assist ECU according to claim 1, wherein the processor is configured to determine that the travel path is the entry path and determine to store the travel path immediately before the registration request is received as the entry path, in a case where the registration request is received, the shift position of the vehicle being a parking position, and there being the travel path immediately before the registration request is received.

4. The park assist ECU according to claim 1, wherein the processor is configured to determine that the travel path is the exit path and determine to store the travel path immediately after the registration request is received as the exit path, in a case where the registration request is received, the shift position of the vehicle being a parking position, and there being no travel path immediately before the registration request is received.

5. The park assist ECU according to claim 1, wherein the processor is configured to determine that the travel path is the exit path and determine to store the travel path immediately before the registration request is received as the exit path, in a case where the registration request is received, the shift position of the vehicle being a position other than a parking position, and a distance traveled by the vehicle after switching of the shift position from the parking position being a predetermined threshold distance or less.

6. The park assist ECU according to claim 1, wherein the processor is configured to determine that the travel path is the entry path and determine to store the travel path immediately after the registration request is received as the entry path, in a case where the registration request is received, the shift position of the vehicle being a position other than a parking position, and a distance traveled by the vehicle after switching of the shift position from the parking position being greater than a predetermined threshold distance.

7. The park assist ECU according to claim 3, wherein the processor is further configured to determine that the travel path is the exit path and determine to store the travel path immediately after the registration request is received as the exit path, in a case where a predetermined time or more has elapsed from a time at which the shift position is switched to the parking position until the registration request is received, even if there is the travel path immediately before the registration request is received.

8. The park assist ECU according to claim 1, wherein the processor is further configured to perform a notification process to notify an occupant of the vehicle that the parking space has been detected, in a case where a distance between a current position of the vehicle and the parking space becomes equal to or less than a predetermined distance based on position information of the vehicle, the notification process including at least one of displaying a notification on a display device or outputting a sound from a speaker.

* * * * *